United States Patent [19]

Marshall et al.

[11] Patent Number: 5,181,015
[45] Date of Patent: Jan. 19, 1993

[54] METHOD AND APPARATUS FOR CALIBRATING AN OPTICAL COMPUTER INPUT SYSTEM

[75] Inventors: Roger N. Marshall, Solana Beach; Lane T. Hauck, San Diego; Leonid Shapiro, Lakeside; Jeffrey W. Busch, San Diego; Eric S. Stevens, El Cajon, all of Calif.

[73] Assignee: Proxima Corporation, San Diego, Calif.

[21] Appl. No.: 611,416

[22] Filed: Nov. 9, 1990

Related U.S. Application Data

[63] Continuation-in-part of Ser. No. 433,029, Nov. 7, 1989, abandoned.

[51] Int. Cl.⁵ .............................................. G09G 3/02
[52] U.S. Cl. .................................... 340/706; 340/707; 356/365
[58] Field of Search .............. 340/707, 709, 706, 705, 340/762, 782; 358/107, 93, 213.13; 434/323, 324, 325, 337; 356/375; 353/122, 28, 43

[56] References Cited

U.S. PATENT DOCUMENTS

| 3,855,096 | 5/1975 | Inuiya | 340/709 |
| 4,280,135 | 7/1981 | Schlossberg | 358/93 |
| 4,576,481 | 3/1986 | Hansen | 356/375 |
| 4,724,480 | 2/1988 | Hecker et al. | 356/375 |
| 4,794,430 | 12/1988 | Whittaker et al. | 340/782 |
| 4,808,980 | 2/1989 | Drumm | 340/707 |
| 4,836,671 | 6/1989 | Bantista | 356/375 |
| 4,846,694 | 7/1989 | Erhardt | 340/707 |

Primary Examiner—Alvin E. Oberley
Assistant Examiner—Xiao M. Wu
Attorney, Agent, or Firm—Bernard L. Kleinke; William Patrick Waters; Jerry R. Potts

[57] ABSTRACT

A method and apparatus facilitates the alignment and light sensitivity adjustment of an optical computer input system, which includes a user generated light directed onto a screen bearing a computer generated image, to convey information to the computer interactively by the user, even in a darkened room. The system discriminates between the user generated image, and the computer generated image. Devices facilitate the proper alignment of the system with the screen, as well as proper light sensitivity adjustments.

32 Claims, 12 Drawing Sheets

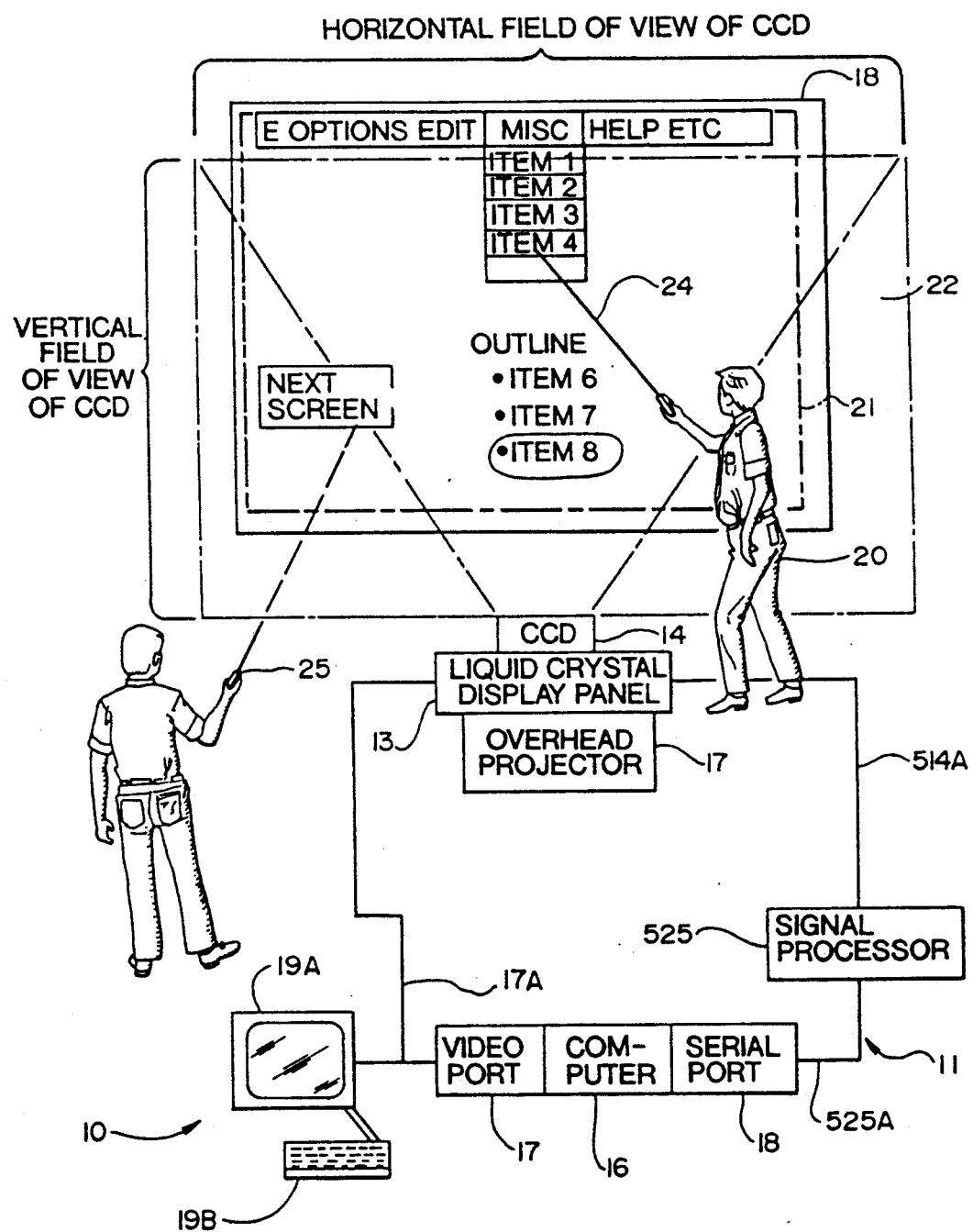

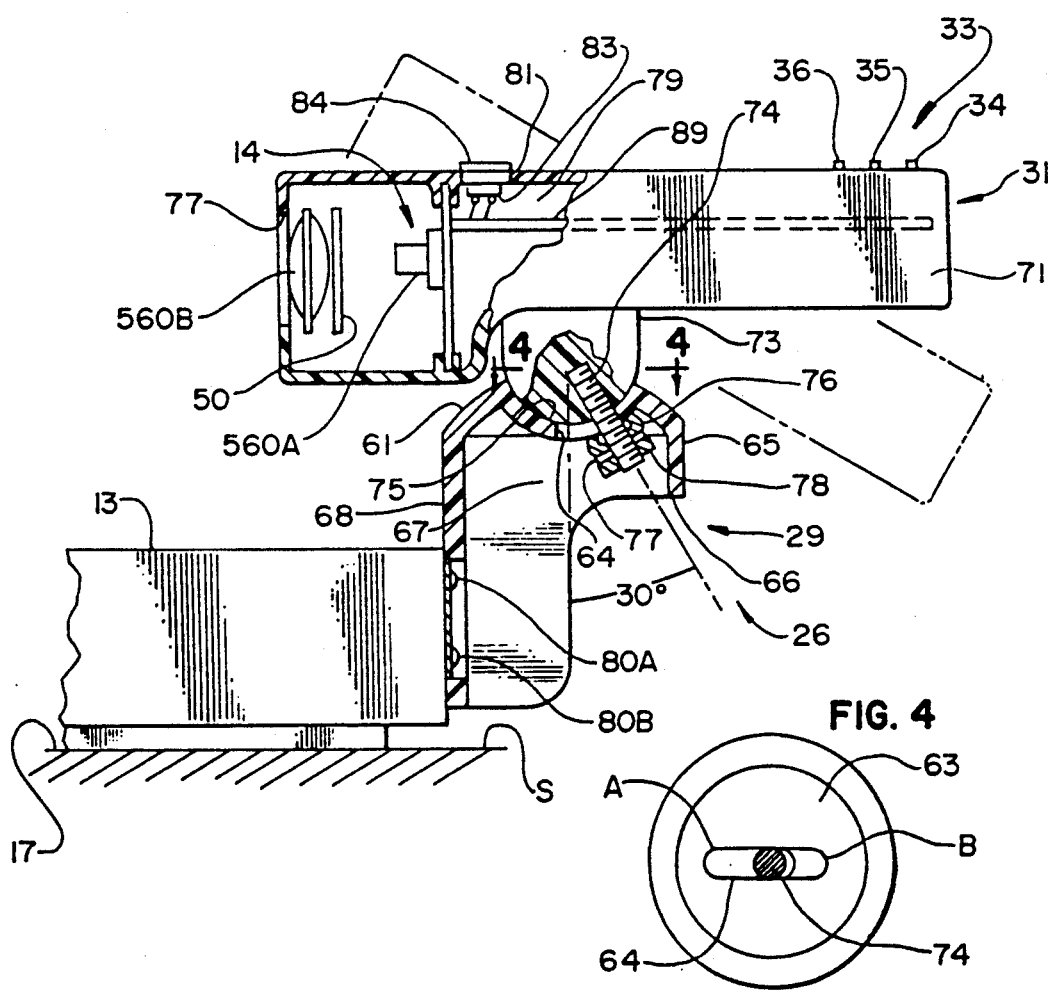

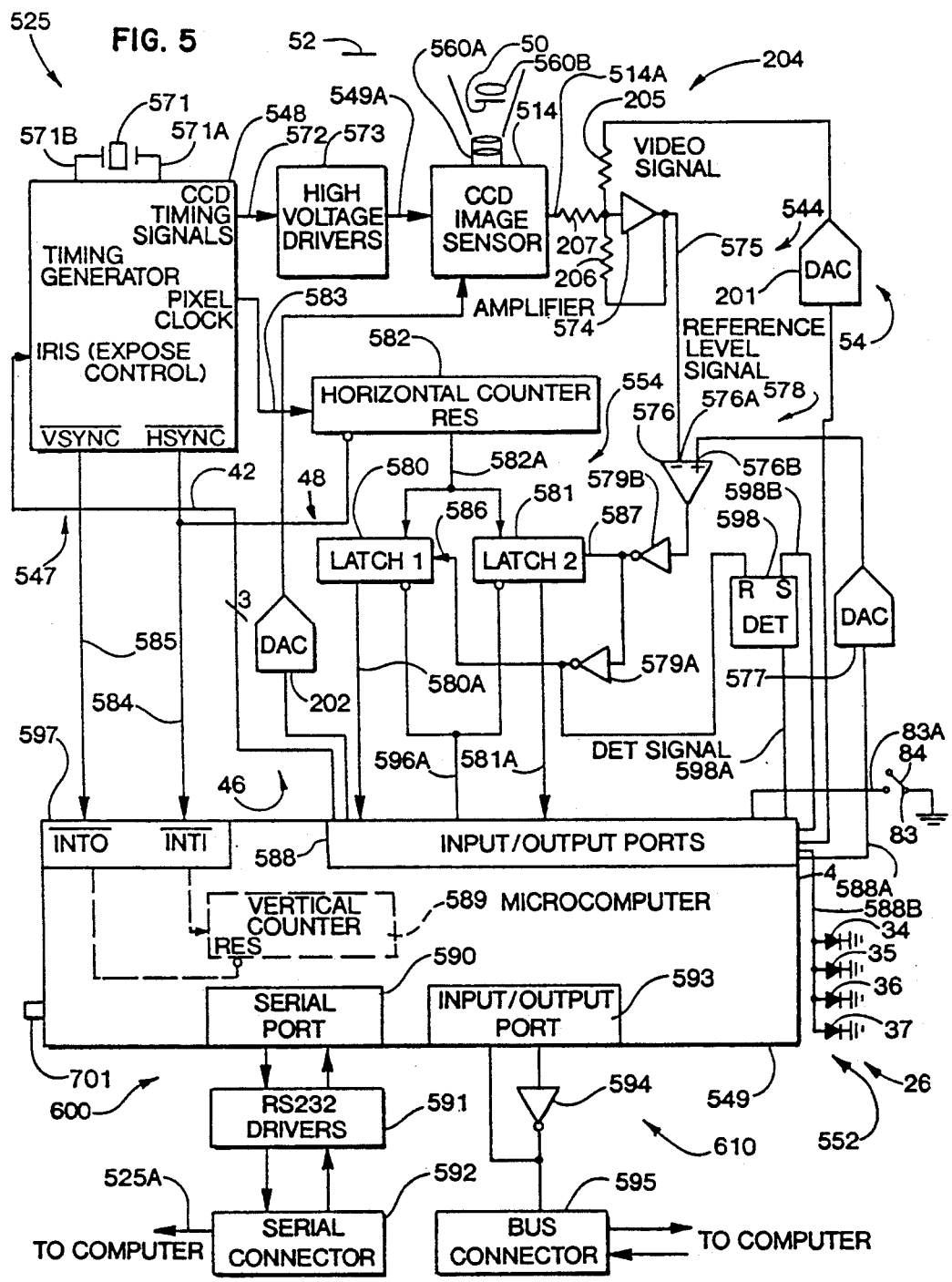

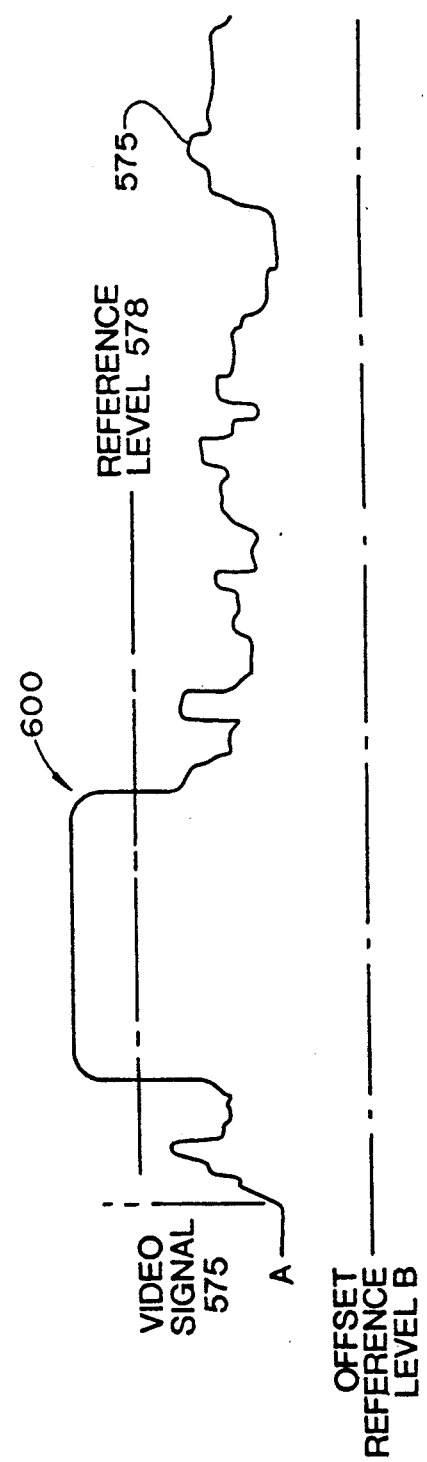

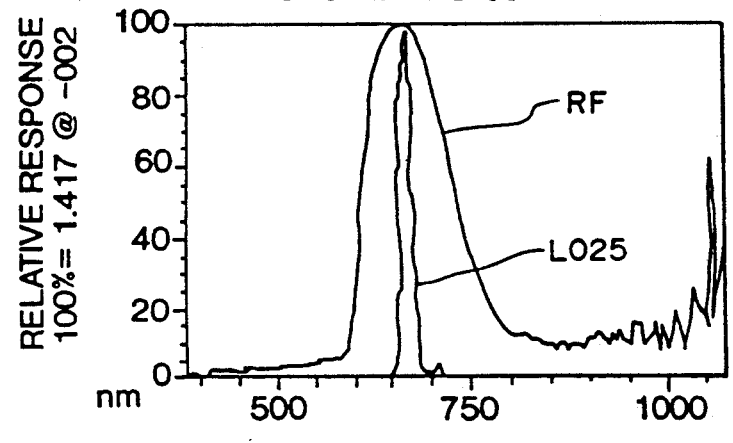
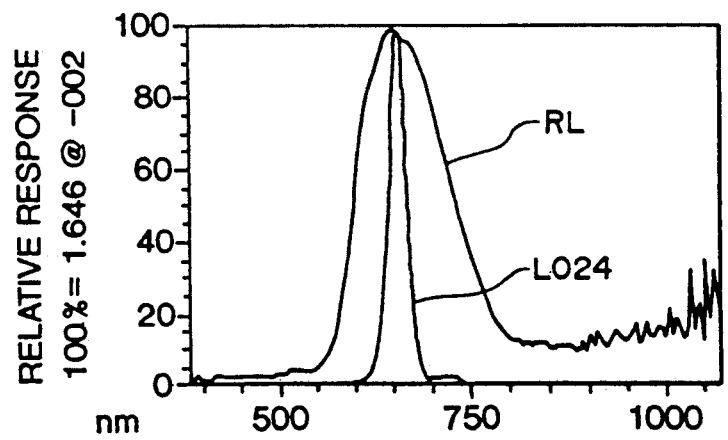

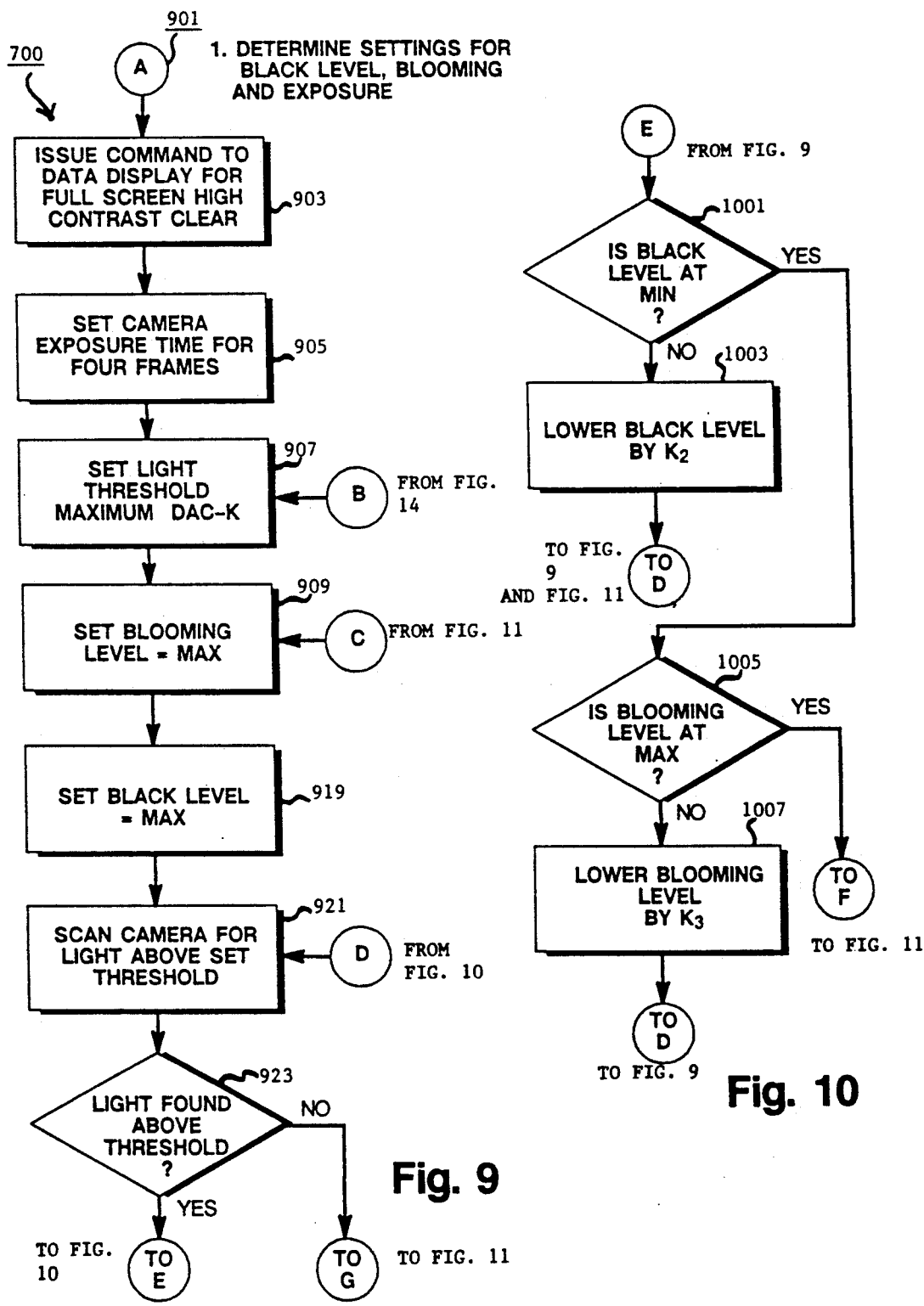

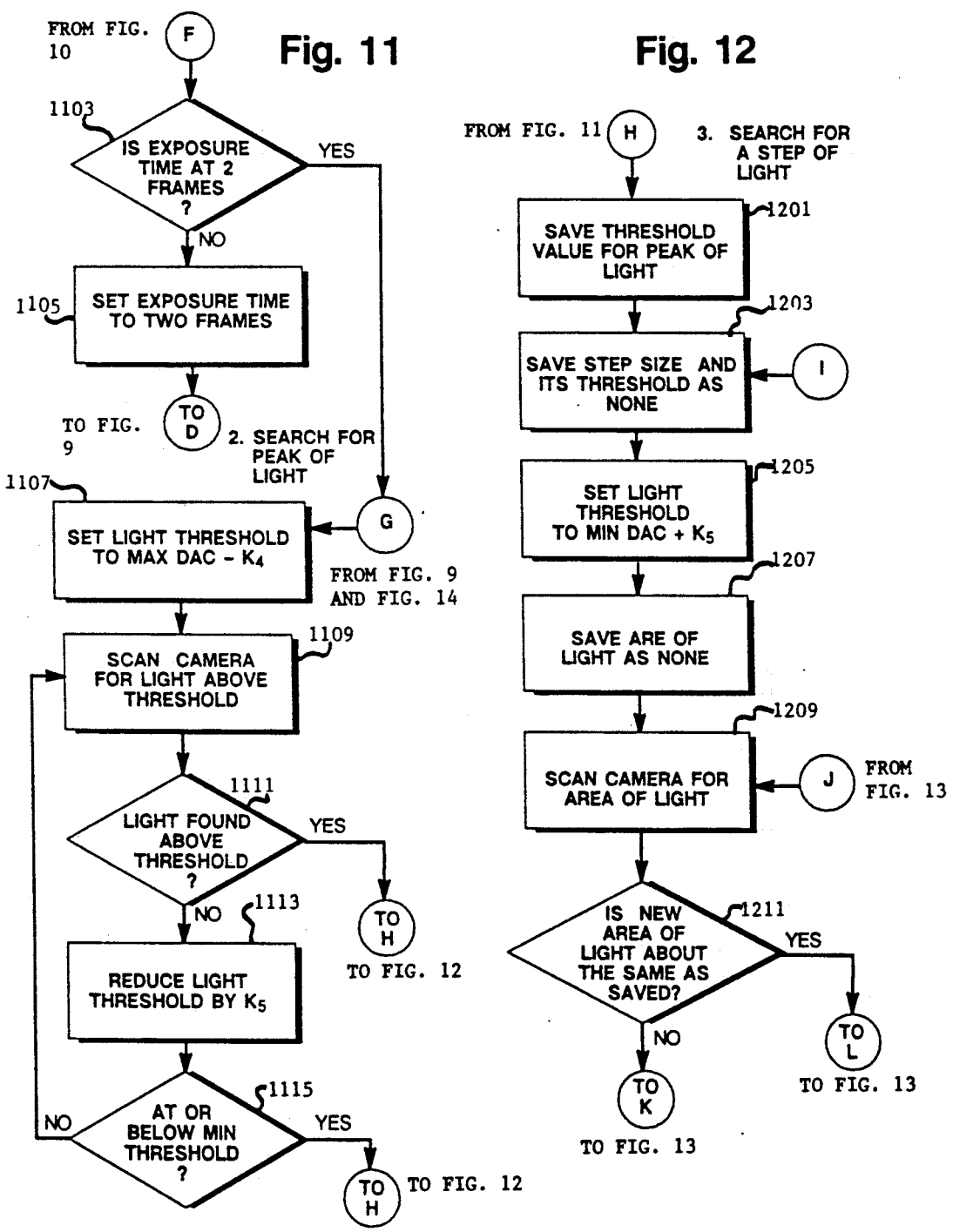

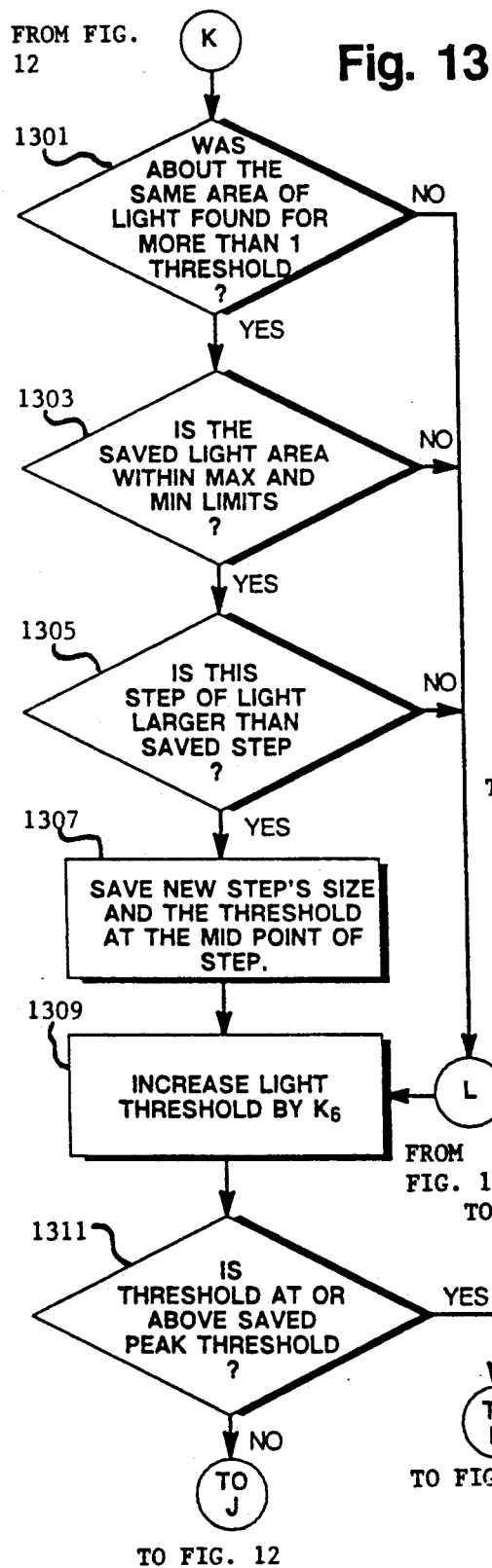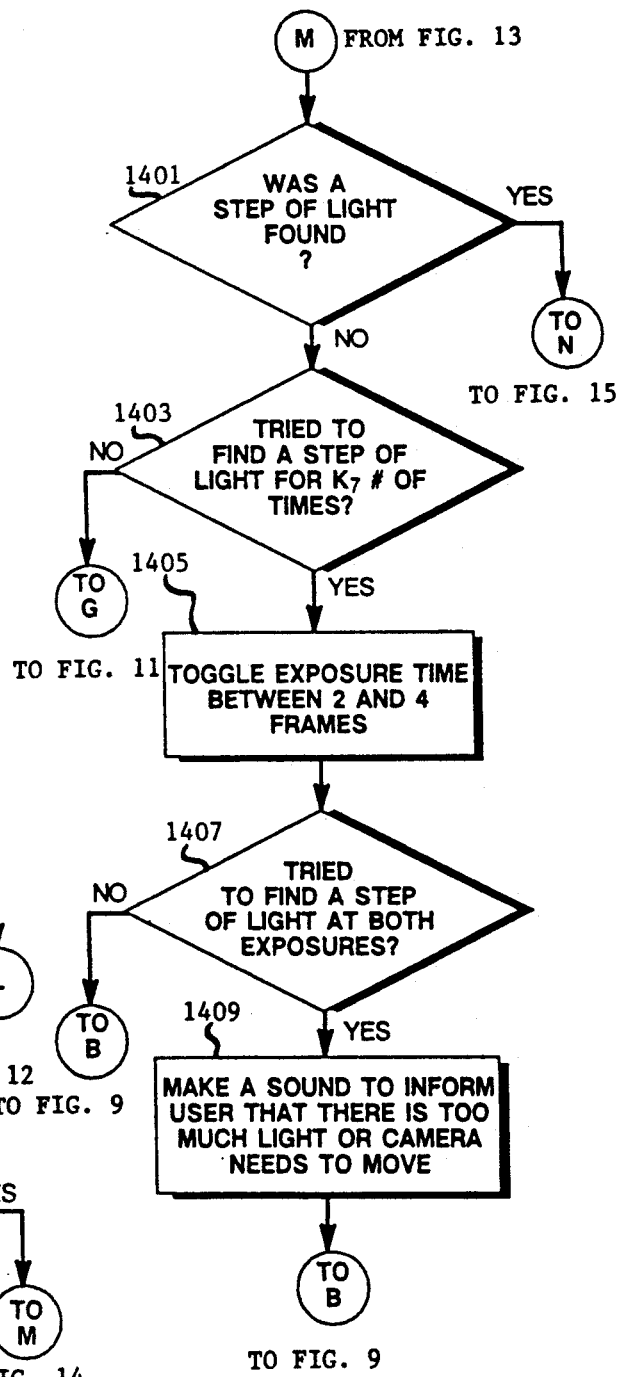

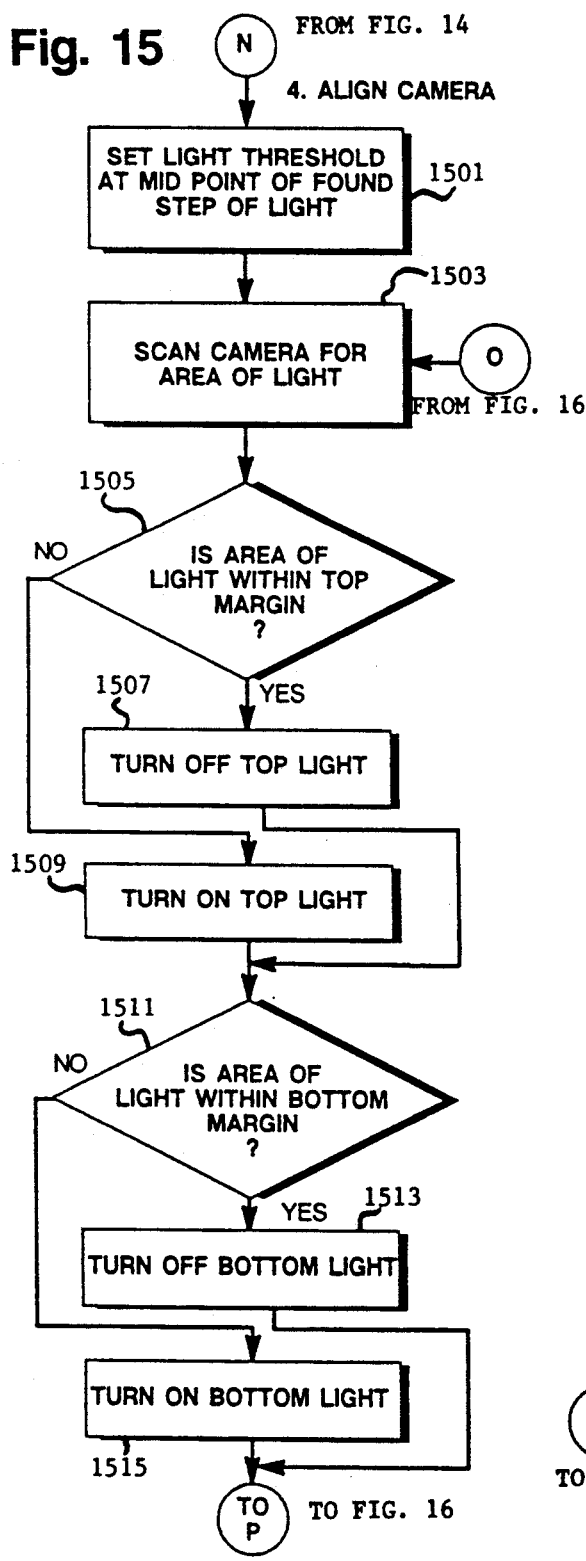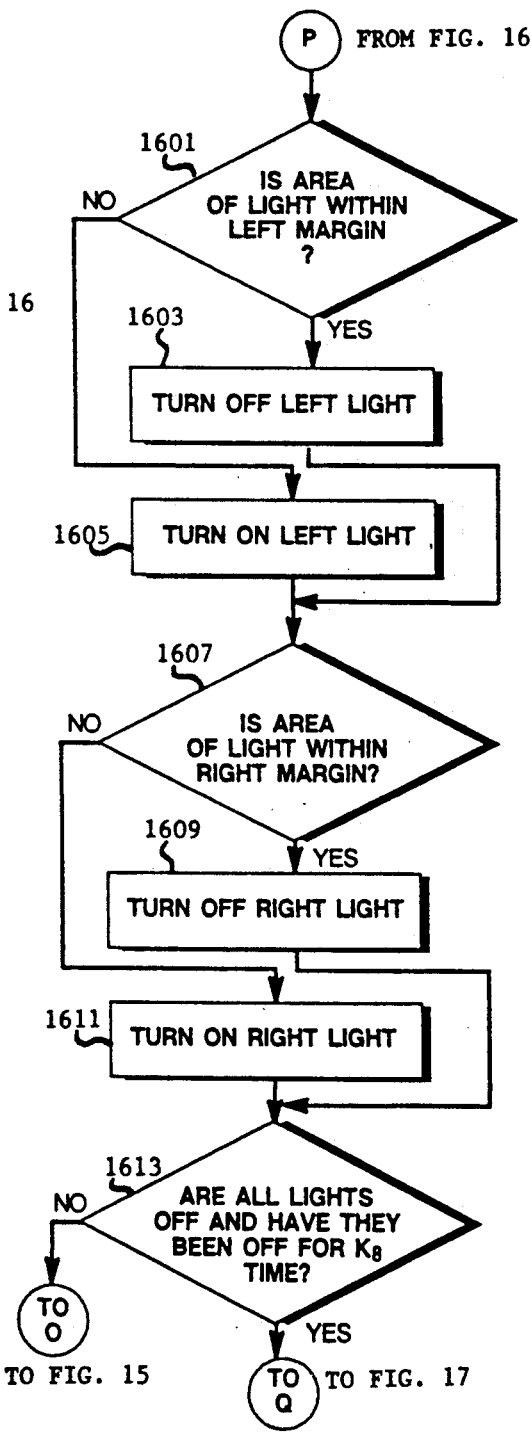

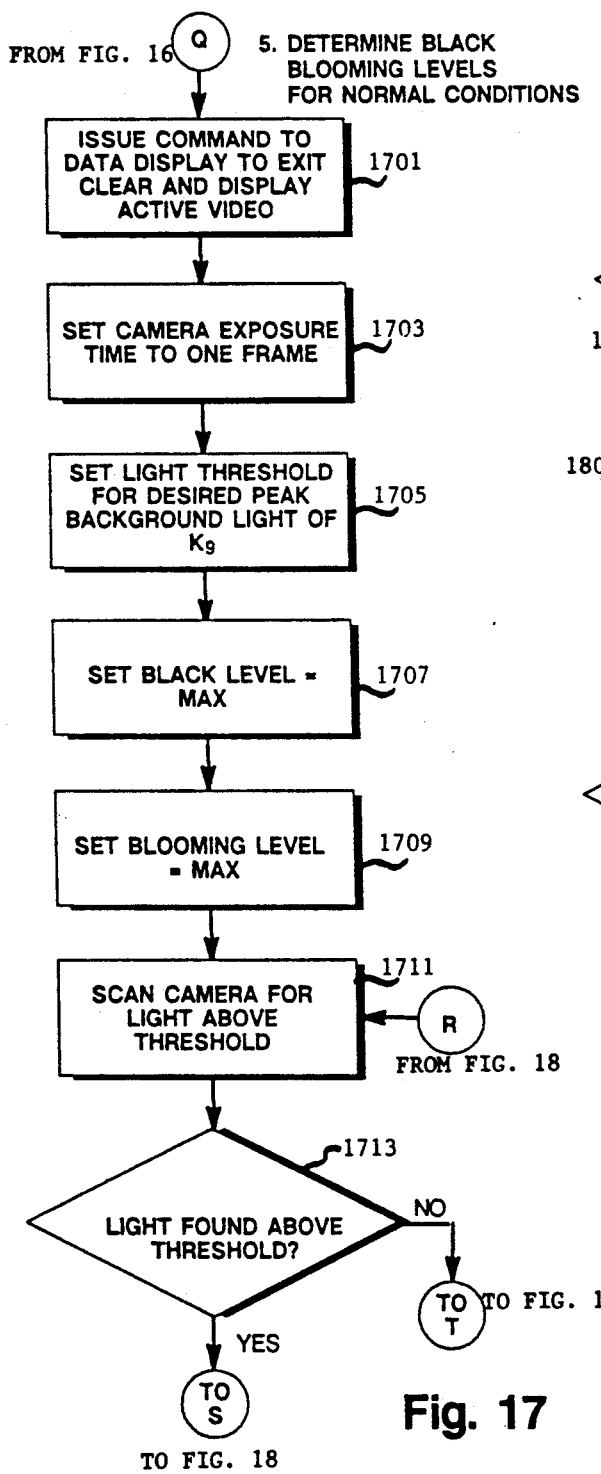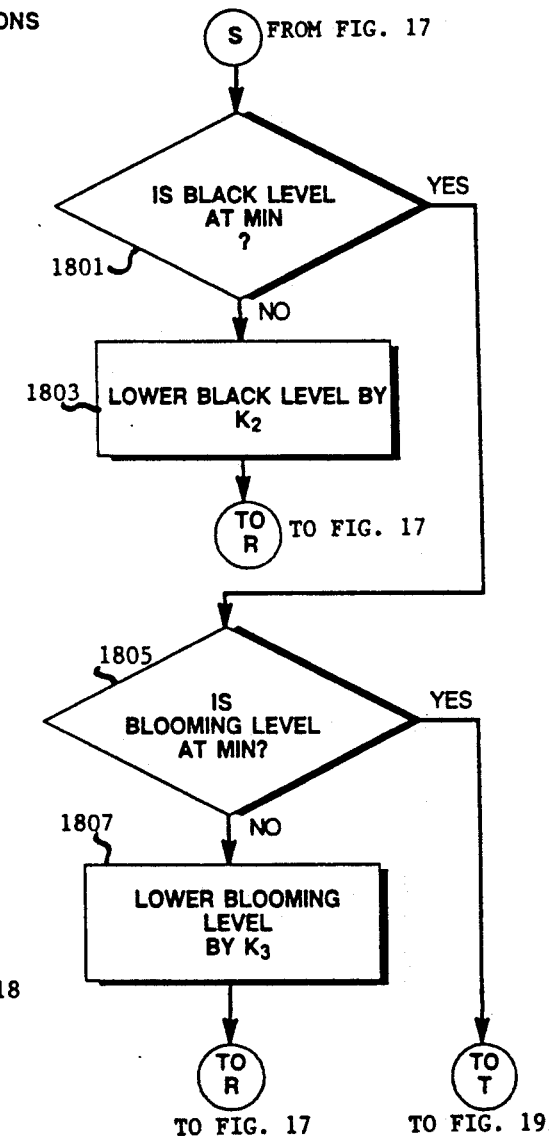
Fig. 17
Fig. 18 ix
METHOD AND APPARATUS FOR CALIBRATING AN OPTICAL COMPUTER INPUT SYSTEM

CROSS-REFERENCE TO RELATED APPLICATIONS

This application is a continuation-in-part application of U.S. patent application Ser. No. 07/433,029, filed Nov. 7, 1989, now abandoned entitled "COMPUTER INPUT SYSTEM AND METHOD OF USING SAME," and is incorporated herein by reference.

TECHNICAL FIELD

This invention relates to the general field of optical computer input system calibration apparatus, and the method of using such apparatus. More particularly, the present invention relates to an optical computer input system calibration apparatus and calibration method, to facilitate accurate communication of user generated information carried by light waves to a computer, which can then utilize the information for facilitating the display of computer generated images.

BACKGROUND ART

There have been many different types and kinds of computer input devices for entering information into a computer. Certain ones of such devices have enabled users to enter information, such as control information, without the use of a keyboard. Such devices include absolute positioning devices such as light pens and digitizing tablets, as well as relative positioning devices such as joysticks, track balls and mouse devices.

While such prior known accessory input devices may have been satisfactory for some applications, it has been proven to be highly desirable to be able to employ such input devices in an interactive mode with a computer, being used with a projector, such as a conventional overhead projector, to generate video images on a large screen for viewing by an audience. In this regard, when the computer generated images are projected onto a screen in a darkened room, it has been desirable to enable the user to enter information interactively into the computer to modify images, or generate additional images during the presentation. For example, it has been found to be highly desirable to underline or otherwise highlight the images projected onto the screen, or, in general, to select images for display in a nonsequential order.

However, such conventional input devices, such as a mouse device, is not convenient to use during a presentation in a darkened room. Thus, a new optical computer input system has been employed. Such system enables the user to shine a high intensity light onto the screen bearing a computed generated image, to provide auxiliary information for the computer. In this regard, such an input system includes an optical sensing device, such as a charge coupled device camera focused onto the screen. Thus, the system can detect the high intensity light images, and discriminate them from the computer generated images, to input information interactively into the computer, in a convenient manner, even in very low ambient light conditions.

Such an optical system is described in greater detail, in the above mentioned copending parent U.S. patent Ser. No. 07/433,029.

While such a computer input system and method of using it, have proven to be highly satisfactory, it would be desirable to facilitate the initial calibration of the system. Such calibration includes proper alignment of the system, such that the viewing area of the light sensing device or camera of the system, is positioned properly to capture the entire displayed projected computer video image. Such alignment is desirable, because the viewing screen of the system may be positioned at various desired distances and angular positions relative to the system light sensing device.

Also, the calibration of such a system entails sensitivity adjustments. Such adjustments are frequently necessary to accommodate for various different projector light source intensities, as well as various different optical arrangements employed in conventional overhead projectors. Thus, different illumination levels for projected images are possible, and the optical input device requires adjustment of optical sensitivity to the projected image.

Another form of light sensitivity calibration necessary for such an optical computer input system, is the calibration of the system such that it can properly distinguish between background light, and light from the high intensity user controlled light. In this regard, because of variations in ambient background lighting, as well as various different intensity levels of projected high intensity light produced by the projection system, it is desirable to distinguish properly the various light sources, and light images, from the user generated light image, so that the system can properly respond to light information conveyed when the user directs the high intensity light onto the same screen as the computer generated images, for modifying or changing them.

Therefore, it would be highly desirable to have a new and improved apparatus and method to calibrate the alignment and light sensitivity of an optical computer input system. Such an apparatus and method should enable a user to align conveniently the system optical sensing device or camera to capture substantially the entire viewing area of a projected image. The apparatus and method should also enable the light sensitivity of the system to be adjusted so that it can easily distinguish various levels of light, whether produced from a computer generated image, or a user generated light image used to entire user generated information into the computer interactively, even in a darkened room.

DISCLOSURE OF INVENTION

Therefore, it is the principal object of the present invention to provide a new and improved apparatus and method for calibrating interactively an optical computer input system for alignment and light sensitivity.

Briefly, the above and further objects of the present invention are realized by providing a new and improved apparatus and method for calibrating an optical computer input system for alignment and light sensitivity.

A method and apparatus facilitates the alignment and light sensitivity of an optical computer input system, which includes a user generated light directed onto a large screen bearing a computer generated image, to convey information to the computer interactively by the user, even in a darkened room. The system discriminates between the user generated image, and the computer generated image. Devices facilitate the proper alignment of the system with the screen, as well as proper light sensitivity adjustments.

The system includes a light sensing device or camera having a raster scan field of view for defining an area of detection. The raster scan field of view includes an area sufficiently larger than the area of a computer generated video image projected onto a screen or other viewing surface area, adjacent to and surrounding the reflected video images. A blooming device controls the sensitivity of the light sensing device to the presence of light, for helping to facilitate the detection of the edge portions of a video image reflected from the viewing surface.

Also, in order to provide additional sensitivity adjustments, a refresh adjustment, and an ambient background light adjustment, are provided. Additionally, an optical bandpass filter tuned to the user generated light, is used to increase light sensitivity to the user generated light, as compared to the computer generated light.

For the purpose of enabling a user to align the raster scan field of view relative to the viewing surface, the apparatus also includes a position indicating device with light emitting indicator devices to assist the user in determining the extend of misalignment. In this regard, devices are provided to scan the computer generated image, and to determine it is disposed entirely within the light sensing device viewing area.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 2 is a partially diagrammatic view of the calibration apparatus of FIG. 1 illustrating its use;

FIG. 3 is a partially cut-away sectioned view of the calibration apparatus of FIG. 1;

FIG. 4 is a sectional view of the calibration apparatus of FIG. 1 taken substantially along line 4—4 thereof;

FIG. 5 is a symbolic block diagram of a control system of the calibration apparatus of FIG. 1 illustrating it coupled to a signal processing unit of an optical computer input system for the panel of FIG. 1;

FIG. 6 is a signal diagram helpful in the understanding of the calibration apparatus of FIG. 1;

FIG. 7 is a spectral diagram helpful in the understanding of the calibration apparatus of FIG. 1;

FIG. 8 is a spectral diagram helpful in understanding of the calibration apparatus of FIG. 1;

FIGS. 9 to 19 are flow diagrams of the software for the calibration apparatus of FIG. 1.

BEST MODE FOR CARRYING OUT THE INVENTION

Figure 1:
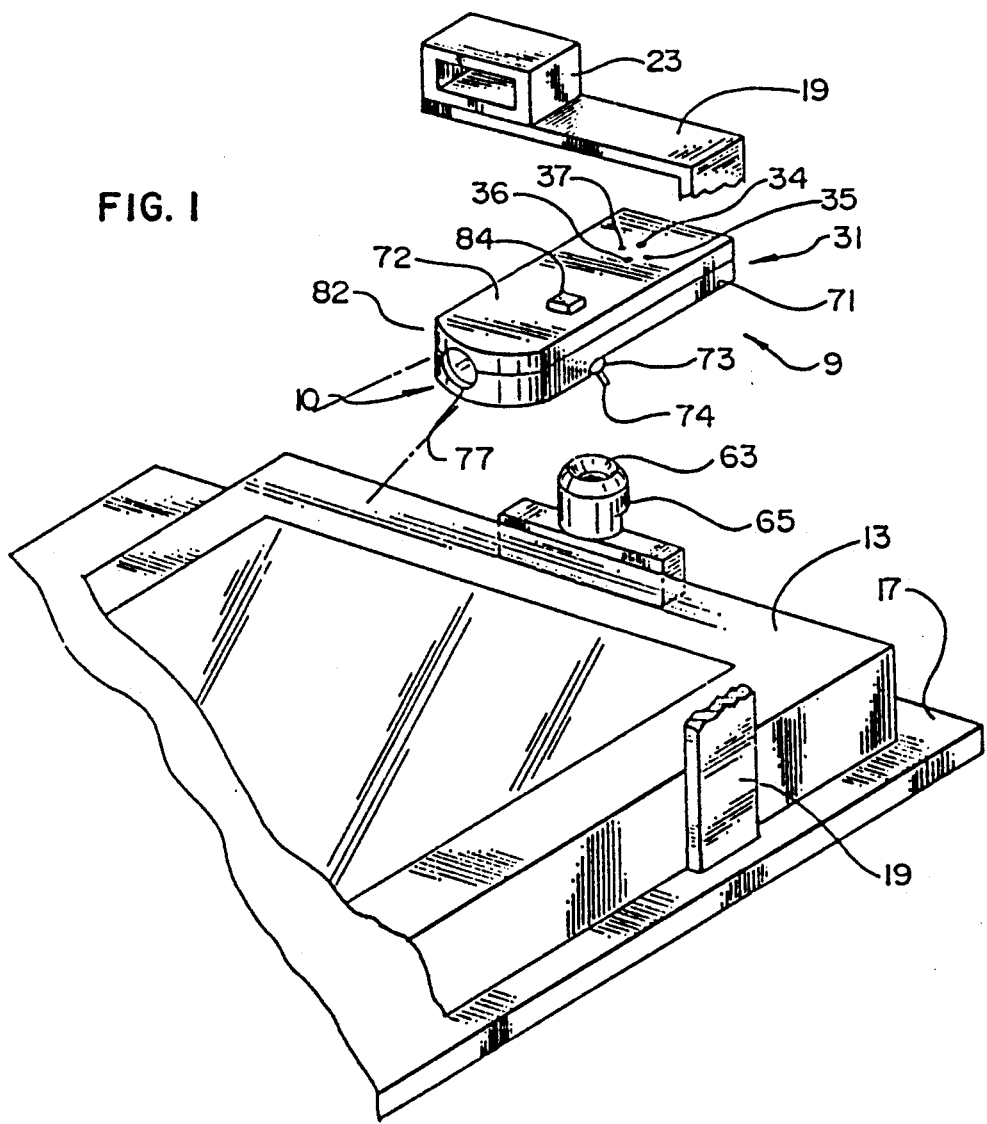
FIG. 1 is a pictorial partially broken away, exploded view of a calibration apparatus, which is constructed according to the present invention, and which is illustrated being mounted on a liquid crystal display panel positioned on an overhead projector for projecting computer generated images.

Referring now to the drawings, and more particularly to FIGS. 1-3 and 5, thereof, there is illustrated a calibration apparatus 9 which calibrates the operation of an optical computer input system generally indicated at 10 as best seen in FIG. 2, and which is constructed in accordance with the present invention. The computer input system 10 is more fully described in the above mentioned U.S. patent application Ser. No. 07/433,029 and includes a liquid crystal display panel 13 for displaying computer generated video images produced by a personal computer 16. In this regard, the panel 13 is driven by the computer 16 for generating light images, which are projected by an overhead projector 17 onto a viewing surface, such as a screen 18. The overhead projector 17 includes a projection lens arm 19 for supporting a projection lens box 23 above the panel 13.

The computer input system 10 includes an image projection arrangement 13 (FIG. 2) whose input path is coupled to the output video port of the computer 16 via a cable 17A. The image detection arrangement 11 generally comprises a charge coupled device image sensor or camera 14 which is coupled to the computer 16 via a signal processing unit 525 (FIG. 5). As best seen in FIG. 2, the signal processing unit 525 is coupled between the output path of the image detection arrangement 11 via a cable 514A and the serial port of the computer 16 via a cable 525A.

The computer input system 10 further includes a light wand or light generating pointing device 24, or a laser light generating device 25 (FIG. 2), sold by Navitar under the tradename POCKET LASER. The device 24 generates an auxiliary light image which may be directed by a user 20 (FIG. 2) to a designated portion or portions of the computer controlled video images displayed on the projection screen or viewing area 18.

The image detection arrangement 11 detects the presence of light reflecting from the screen 18 as well as the normal background light in the area where the input system 10 is disposed. In this regard, the image sensor 14 generates an analog electrical signal in response to the detection of light, which is coupled to the signal processing unit 525 via a cable 514A. The signal processing unit 525 responds to the analog signal, and converts the signal into digital pixel coordinate reference signals which identify the relative position of an auxiliary light image on the screen 18 produced by device 24. The pixel coordinate reference signals are transmitted to the computer 16 via the output cable 525A. Computer 16 responds to the pixel coordinate signals, and can alter its application program which causes the computer controlled images being projected onto the screen 18. For example, the computer controlled images being projected onto the viewing area 18 can be modified in accordance with the information contained in the coordinate reference signals. The computer input system 10 is more fully described in the above referenced U.S. patent application Ser. No. 07/433,029 and will not be described in further detail herein.

As best seen in FIGS. 3, 4 and 5, the calibration apparatus 9 generally comprises a user interactive alignment arrangement 26 for detecting when the viewing area of the image sensor 14 is not in proper alignment with the computer controlled video image reflecting from the viewing surface 18, and for providing a user with a directive visual indication for how to achieve a proper alignment. The alignment arrangement 26 comprises a support unit 29 for mounting the image sensor 14 in a housing 31 in a suitable manner so that the normal field of view of the image sensor 14 is able to receive light reflecting from the viewing surface 18. The alignment arrangement 26 also include a positioning indicator 33 for providing a user with a visual indication for adjusting the pitch and yaw of the image sensor so that its field or view is able to receive light reflecting from the viewing surface 18. The positioning indicator 33 is coupled to the signal processing unit 525 by leads 588B (FIG. 5) and includes a set of four light emitting diodes 34-37. The diodes 34-37 are mounted to the housing 31 in a generally diamond shaped configuration. Each diode, such as diode 34, is separately controlled by the signal processing unit 525 for giving a visual indication to a user for adjusting the pitch and yaw of the housing 31 for alignment purposes.

As shown in FIG. 5, for the purpose of controlling the sensitivity of the image sensor 14 to various luminance levels of light the calibration apparatus 9 also includes a sensitivity arrangement, shown generally at 46. The sensitivity arrangement 46 comprises a blooming control unit 48 which is coupled between the image sensor 14 and a microprocessor 549. The microprocessor 549 forms part of the signal processing unit 525 and is controlled by an adaptive algorithm firmware 700. The algorithm firmware 700 controls the refresh rate (exposure time) and blooming level (sensitivity) of the image sensor 14 so that sensor 14 is able to generate a video signal having a sufficient differential between background light and light reflecting from the viewing surface 18 to detect light generated by device 24.

As shown in FIG. 5, in order to allow the image sensor 14 to improve its signal to noise ratio for detecting light generated by the devices 24 and 25, the sensitivity arrangement 46 also includes an optical band pass filter 50. As will be explained hereinafter in greater detail, filter 50 is used with and is tuned to the light generating devices 24 and 25. As shown in FIG. 5, an alternative filter 52 can also be used with both devices 24 and 25 (FIG. 2) and is tuned thereto.

As shown in FIG. 5, for the purpose of controlling the video output signal of the image sensor 14 to differentiate between ambient background light and light reflecting from the viewing surface 18, the calibration apparatus also includes an offset circuit, shown generally at 54. The offset circuit 54 is coupled to the microprocessor 549 for the purpose of allowing the offset circuit 54 to be controlled by the algorithm firmware 700 (FIGS. 9-19) in microprocessor 549.

In operation, after the system 10 has been set up, for presentation purposes, a user 20 (FIG. 2), will generally point the housing 31 toward the viewing surface 18. The user then activates the calibration apparatus 9 by depressing a button 38 disposed on the top of the housing 31. When the user presses the button 38, the microprocessor 549 sends an initiation signal to the display panel 13 which responds by clearing the visual image from the screen 18 so that a bright, clear white rectangle of light is reflected from the viewing surface 18. Alternatively, microprocessor 549 could send such a signal to the computer 16. When the display panel 13 has cleared the screen, a signal is returned to the microprocessor 549 in the signal processing unit 525 for causing an initiation signal which starts the algorithm firmware 700.

As best seen in FIG. 2, the field of view of the image sensor 14, shown generally at 22 is misaligned with the video image 21 projected on the screen 18. In this regard, the upper portion of the video image 21 is positioned above the upper portion of the field of view 22 of the image sensor 14. As will be explained hereinafter in greater detail, the firmware program 700 will cause a visual indication to be given to the user 20 of this misalignment. Such a visual indication is also instructive directing the user 20 to raise the front of the housing 31 to permit the field of view 22 to be extended above the video image shown generally at 21.

Stated otherwise, if the field of view of the image sensor 14, shown generally at 22, does not include all of the reflected visual image produced by the computer 16, one or more of the light emitting diodes 34-37 (FIGS. 1 and 5) will be actuated to prompt the user 20 to reorient the housing 31 for alignment purposes For example, as shown in FIG. 2, light emitting diode 36 would be actuated prompting the user 20 to increase the pitch of housing 31 so that the field of view of the image sensor 14 would include the top portion of the image produced by computer 16, shown generally at 21. As the user 20 increases the pitch of the housing 31, the light emitting diode 36 will be turned off when the top most portion of the image 21 is within the field of view 22. The algorithm firmware 700 will continue to cause the LEDs 34-37 to be actuated providing prompting directions to the user for achieving a proper alignment.

Once a proper alignment of the image sensor viewing field 22 has been achieved, the algorithm firmware 700 causes all four light emitting diodes 34-37 to be extinguished and to send a signal to the display panel 13. When the display panel 13 receives the signal, the display panel once again causes the normal visual image to be displayed on the screen 18. Once the display panel has caused a visual image to be displayed, the microprocessor 549 uses the algorithm firmware 700 to adjust the contrast or sensitivity level of the system 10. In this regard, the algorithm firmware 700 causes the sensitivity arrangement 46 to set the background level, blooming level and exposure time of the image sensor device 14 to optimum levels for the purpose of viewing the projected light.

The microprocessor via the algorithm firmware 700 then determines the peak value of the projected light for normal display conditions. Once the peak detected level for the projected light for a normal display condition has been determined, the algorithm firmware proceeds to set the threshold level for a spot of light. As a final step, the algorithm causes a sound indication to be given to the user by a speaker, not shown, for the purpose of registering the projected image with respect to the charge coupled device camera image. In response to the sound condition, the user employs the pointing device 24 to reflect a high intensity light from the viewing surface 18 at the edges of the projected image screen. The microprocessor 549 in cooperation with the algorithm firmware 700 then adjusts the threshold level to distinguish between the computer generated video signals produced by the video information light and the video information produced by the light pointing device 24.

Should any one of the above described adjustments fail to produce a satisfactory calibration, the microprocessor causes a distinctive alarm signal to be generated for the purpose of informing the user that the calibration procedure has not been successfully completed. In this regard, the user then makes an appropriate adjustment by, for example, lowering the background light. Once the user has made the necessary adjustment, the calibration procedure is once again initiated and repeated allowing the calibration to be completed.

Considering now the alignment arrangement 26 in greater detail with reference to FIGS. 1-5, the support unit 29 generally comprises a support unit top portion 61 for receiving a ball 73 which is integrally connected to the underside of a base portion 71 of the housing 31. The top portion 61 is mounted on the LCD panel 13 at the rear side wall thereof (FIGS. 1 and 3) and includes a socket 63 which is adapted to receive and support the ball 73 in a universal manner to permit the housing 31 to be adjusted positionally relative to the screen 18. The top portion 61 is integrally connected to a side wall portion 65 which is generally tubular in shape. The side wall 65 extends downwardly from the top portion 61 terminating in a circumferential lip shown generally at 66 for defining an interior cavity 67. The cavity 67 is sufficiently large, that a user may easily have access thereto. A back wall portion 68 is integrally connected to a portion of the side wall portion 65 for defining a mounting surface between the support unit 29 and the panel 13. The back wall portion 68 includes a pair of holes 70A and 70B adapted to receive a pair of screws 80A and 80B respectively for securing the back wall portion 68 of the support unit 29 to the panel 13.

It should be understood that, while the housing 31 is shown and described to be mounted to the LCD panel, the housing could alternatively be mounted to other portions of the panel or the projector. It can also be used in a free standing mode of operation, by a suitable modification, as will become apparent to those skilled in the art.

Considering now the top portion 61 in greater detail with reference to FIGS. 3 and 4, the socket 63 includes a base with an elongated slot 64 which extends in an arcuate manner extending longitudinally at the base of the socket. Slot 64 is adapted to receive a threaded rod 74 depending from the bottom portion of ball 73. The rod 74 depends from a base portion or bottom most portion 75 of the ball inclined from the vertical by an angle of approximately 30°. In this regard, when the rod 74 is disposed within the slot 64, the ball 73 can move along a path defined by the slot 64.

As best seen in FIGS. 3 and 4, when the rod 74 has traversed to its furthest point forwardly, as shown at A in FIG. 4, the base portion of housing 31 is positioned inclined upwardly front to rear at an angle of about 30° to the horizontal, as indicated in phantom lines in FIG. 3. In a similar manner, when the rod 74 is disposed at its opposite furthest rearward point of travel within slot 63 as shown at B in FIG. 4, the housing 31 is generally horizontal, as shown in solid lines in FIG. 3. From the foregoing it should be understood that the socket 63 and ball 73 in cooperation with the slot 64 and rod 74, permit a 30° up and down pitch movement of the housing 31 between a 0° horizontal reference, and an upwardly inclined position disposed at about 30° to the horizontal as indicated in phantom lines in FIG. 3, as well as being infinitely variable therebetween. This pitch movement allows the field of view of the image sensor 14 to be adjusted relative to the viewing surface 18.

In order to secure the ball 73 within the socket 63 releasably at an adjusted position, the rod 74 is adapted to receive a cupped washer 76 and nut 78. The spring washer 76 and nut 78 hold the ball 73 snugly in socket 64. A curved washer 77 between washer 76 and nut 78 provides a sufficient resilient force whereby a user may move the rod 74 within the slot 64 for alignment purposes and with a sufficient force to hold the ball 73 and socket 74 in a stationary position when the user releases the housing 31.

Considering now the housing unit 31 in greater detail with reference to FIGS. 1 and 3, the housing unit 31 is generally a rectangularly shaped box having a slightly curved front portion 82. The unit 31 includes the base portion 71 with the integrally connected ball 73 depending therefrom for permitting the housing 31 to rest supportably within support unit 29. The housing unit 31 also includes a top portion 72 which matingly engages the base portion 71 to form a closed hollow interior 79 within the housing 31.

In order to permit lateral or side-to-side positional adjustment of the housing 31 relative to the socket and thus the screen, the ball 73 is free to rotate about the rod 74. Thus, the housing 31 can be positionally adjusted upwardly and downwardly, as well as side to side, in an infinitely and universally adjustable manual manner. Also, as previously explained, the adjusted position is retained releasably.

When the base and top portions 71 and 72 are matingly engaged a centrally disposed hole 77 is formed in the curved front portion 82. Hole 77 defines a viewing window for the image sensor device 14 which is mounted within the hollow interior 79.

The top portion 72 of the housing 31 includes a hole 81 housing a generally rectangularly shape for receiving an actuator switch with a button 84 which extends above the top surface of the top portion 72. The top portion also includes a set of holes 85, 86, 87 and 88 adapted to receive the light emitting diodes 34–37 respectively. The actuator switch 83 and the light emitting diodes 34–37 are connected by conductors 83A and 588B respectively to a printed circuit board 89 mounted within the hollow interior 79 of the housing unit 31 by means not shown. The printed circuit board 89 has the various electronic components mounted thereto forming the signal processing unit 525 and other electric circuits of the apparatus 9.

As best seen in FIG. 3, the image sensor 14 is mounted in the front portion of the housing 31 and includes the filter 50 which is interposed between a pair of lenses 560A and 560B. Lens 560A is the conventional focusing lens of the sensor 14 while lens 560B is a magnifying lens for optimizing the field of view of the sensor 14. The filter 50 and the lenses 560A and B are mounted within the housing 31 by means not shown.

Considering now the sensitivity arrangement 46 in greater detail with reference to FIG. 5, the blooming control unit 48 generally comprises a digital to analog converter 202 coupled between the input/output port 588 of microcomputer 549 and the CCD image sensor 14. The digital to analog converter 202 supplies a bias voltage to the image sensor 14, under the control of the algorithm program 700, for increasing and decreasing the charging capability of the image sensor 14 in response to light. More particularly, the blooming control unit permits the CCD image sensor 14 to amplify differences between bright and dim luminance levels. The manner in which the algorithm program 700 controls the operation of the bloom control unit 48 will be described hereinafter in greater detail.

As best seen in FIG. 5, the image sensor 14 is driven by a set of high voltage drivers controlled by CCD timing signals. For the purpose of controlling the sensitivity of the sensor 14 to various light image intensity levels produced by the overhead projector 17 in cooperation with the computer 16 and panel 13, the microprocessor 549 under the control of the algorithm program 700 generates an IRIS signal which is coupled to the timing generator 548. The IRIS signal causes the CCD timing signals coupled to the image sensor 14 to be changed between a maximum refresh rate of 4 frame periods to a minimum refresh rate of 1 frame period. In this regard, with a maximum refresh rate of 4 frame periods for example, the image sensor 14 ill accumulate more of charge in response to image signals than with a minimum refresh rate of 1 frame period. The IRIS signal thus, causes gross light sensitivity changes for the calibration procedure as will be described hereinafter in greater detail.

Considering now the offset circuit 54 in greater detail with reference to FIG. 5, the offset circuit 54 generally comprises a digital to analog converter 201 which is coupled between the input/output ports 588 of the microprocessor 549 and a resistor network 204. The network 204 includes a resistor 205 coupled between the input of amplifier 574 and the output of the digital to analog converter 201, a feedback resistor 206 coupled between the input and the output of video amplifier 574 and a resistor 207 coupled between the output of the image sensor 14 and the input to the video amplifier 574. From the foregoing, it will be understood, that the digital to analog converter 201 supplies a bias or offset voltage to the amplifier 574 for increasing and decreasing the DC level of the video output signal coupled to a comparator 576 in the signal processing unit 525. The digital to analog converter 201 is controlled by the microprocessor 549 under the control of the algorithm program 700 for controlling the DC offset of the video signal in response to background or ambient light. As best seen in FIG. 6, the video signal 575 is referenced to the bias voltage B produced via the analog to digital converter 201 and the resistor network 204 coupled to amplifier 574. The manner in how the algorithm program 700 controls the offset circuit 54 will be described hereinafter in greater detail.

Considering now the optical filters 50 and 52 in greater detail with reference to FIGS. 3, 7 and 8, the filter 50 is a ruby acetate filter for use with the laser pointer 25 or the LED pointer 24. The filter 50 is placed on front of the image sensor 14 focusing lens (FIG. 3). The filter characteristics are such that it passes a given bandwidth of light and attenuates all other light. FIG. 7 is a graph of the response RF of filter to various wavelength of light. FIG. 7 also illustrates the light output L025 of the laser pointer 25.

The filter 50 improves the signal to noise ratio of the signals being evaluated for calibration purposes. The filter 50 thus, enables the signal processing unit 525 to better differentiate between the background ambient light and the light generated by pointer 25.

As seen in FIG. 8, an alternative filter 52 may be used as an optical filter. In this regard, filter 52 is a ruby lith filter. The response RL characteristics of filter 52 to various wavelength of light is shown in FIG. 8. FIG. 8 also illustrates the light output L024 of the LED pointer 24. Tables I and II provide a further detailed description of the respective filter 50 and 52 and pointers 24 and 25.

TABLE I

| FILTER TYPE | LUMINANCE | RADIANCE | C.I.E. 1976 1931 |
|---|---|---|---|
| RUBY ACETATE | 8.896e + 001fl 3.048e + 002 cd/mz | 2.948e + 000 w/sr*mz | x = 0.6140 y = 0.3528 u$^1$ = 0.4089 v$^1$ = 0.5287 v = 0.3525 |
| RED LITH | 8.880e + 001fl 3.980e + 002 cd/me | 2.522e + 000 w/sr*mz | x = 0.6194 y = 0.3361 u$^1$ = 0.4276 v$^1$ = 0.5220 v = 0.3480 |

TABLE II

| POINTER TYPE | LUMINANCE | RADIANCE | C.I.E. 1976 1931 |
|---|---|---|---|
| LASER POINTER | 2.050E + 001F1 7.022E + 001 cd/mz | 3.213E + 000 w/sr*z | x = 0.6875 y = 0.2888 u$^1$ = 0.5402 v$^1$ = 0.5106 v = 0.3404 |
| LED POINTER | 6.420e + 001fl 2.200e + 002 cd/mz | 3.320e + 000 w/sr*mz | x = 0.6937 y = 0.2963 u$^1$ = 0.5369 v$^1$ = 0.5160 v = 0.3440 |

Referring now to FIG. 6, an illustrated example of the offset voltage for video amplifier 574 is shown. In this regard, line A is a representation of the video signal output 575 from amplifier 574 when the image sensor 14 is focused on an area of the screen 18 and the light generating device 24 causes a bright spot of light to appear on the screen 18. In this regard, an analog level 600 is generated that is higher in amplitude than the surrounding signal 575 which is also detected by the image sensor 14. As indicated in line B, the reference level voltage signal 578 has been set by the algorithm firmware 700 to detect the light pulse signal 600 and not the background illumination or the computer generated display information is indicated by signal 575. Also as indicated in FIG. 6, the offset reference level voltage B produced by digital to analog convertor 201 under the control of the algorithm firmware 700 is shown. This voltage level may be varied relative to the reference level 578. As will be explained hereinafter in greater detail, the algorithm firmware 700 adjusts the offset reference level B so that the video signals 575 will not exceed the reference level voltage 578 with respect to any background light.

Considering now the algorithm program 700 in greater detail with reference to FIGS. 9-19, the algorithm program 700 controls the operation of the calibration apparatus 9 interactively and adaptionally with the user 20.

The algorithm firmware 700 starts at a box 901 in FIG. 9, in response to a user actuating switch 83 on the housing unit 31. In response to the actuation of switch 83, the program proceeds to an instruction command 903 which issues a command to the data display system for a full screen high contrast clear image. After issuing the command to the computer 16, the program proceeds to instruction 905 and sets the iris signal or exposure control signal for a maximum exposure time of four frames. The program then advances to instruction box 907 and sets the light threshold level to its maximum level which is expressed as DAC-K. In this regard the digital to analog converter 201 is set to its maximum offset voltage K. After setting the light threshold to its maximum level, the program proceeds to instruction box 909 and sets the blooming level to its maximum. In this regard, the output voltage or bias voltage of the digital to analog converter 202 (FIG. 5) is set to is maximum level. After the blooming level has been set to its maximum level, the program then advances to instruction box 919 and sets the background light level to its maximum level. In this regard, the reference level signal 578 supplied by digital to analog converter 201 (FIG. 5) is set to its maximum voltage. Once the reference level volt signal has been set to its maximum level, the program then advances to instruction box 921 which commands the image sensor 514 to scan for a light level that is above the set threshold level; e.g., DAC-K. The program then advances to a decision instruction 923 to determine whether a video signal has been produced indicating that light has been found above the threshold level. If light has not been found above the threshold level, the program goes to box G in FIG. 11 to search for a peak of light. Box G allows the program to execute an instruction command in box 1107 to set the light threshold to its maximum at DAC-K4. After setting the light threshold to its maximum DAC-K4 level, the program advances to instruction box 1109 and once again, instructs the CCD image sensor 14 to scan for light above the threshold level. The program then advances to decision box 1111 to determine whether light has been found above the threshold level. If no light has been found, the program advances to instruction box 1113 and reduces the light threshold level by K5. After reducing the light threshold level by K5, the program proceeds to decision box 1115 to determine whether the light is at or below the minimum threshold level. If the light is not at or below the minimum threshold level, the program returns to instruction 1109 and proceeds as described above. If the light is at or below the minimum threshold level, the program proceeds to box H (FIG. 12).

Referring again to FIG. 9, if at decision instruction box 923 light was found above the threshold level, the program advances to box E in FIG. 10. From box E the program proceeds to decision instruction 1001 and determines whether the background level is at a minimum. If the background level is not at a minimum, the program advances to instruction box 1003 and lowers the background level by K2. After lowering the background level to K2, the program goes to box D which returns to instruction 921 in FIG. 9. At instruction 921, the program again causes the image sensor 14 to scan to determine whether the detected light is above the set threshold level and proceeds as previously described.

At decision instruction 1001 in FIG. 10, if the background level is at a minimum, the program advances to decision instruction 1005 to determine whether the blooming level is at a maximum. If the blooming level is not at a maximum, the program advances to command instruction 1007 and lower the blooming level by K3 and then goes to box D and again executes instruction 921 in FIG. 9. If at decision box 1005 in FIG. 10 the blooming level is determined to be set at a maximum level, the program advances to box F in FIG. 11. From box F in FIG. 11, the program executes a decision instruction 1103 to determine whether the exposure time has been set at a two frame period. If the exposure time has not been set to a two frame period, the program advances to instruction box 1105 and set the exposure time for two frame periods and then goes to box C returning to FIG. 9 at instruction 921. The program then proceeds as previously described.

Referring again to FIG. 11, at the decision box 1103, if the exposure time has already been set to a two frame time period, the program goes to box G which allows command instruction 1107 to be executed for the purpose of again search for a peak of light. At box 1107, the program sets the light threshold to the maximum DAC-K4 level and then advances to command instruction 1109 where the image sensor 14 is instructed to scan for light above the threshold level. After instructing the camera to scan for the light above the threshold level, the program advances to decision box 1111 to determine whether light has been found above the threshold level. If no light is found above the threshold level, the program proceeds to command instruction 1113 and reduces the light threshold by the K5 amount. After inducing the light threshold level by the K5 level, the program goes to decision box 1115 to determine whether the light is at or below the minimum threshold level. If the light is not at or below the minimum threshold level, the program returns to instruction box 1109 and proceeds as previously described.

Referring again to FIGS. 11 and 12 at decision instruction 1111, if light is found above the threshold level, the program advances to box H of FIG. 12. At box H of FIG. 12, the program searches for a step of light. In this regard, the program proceeds to execute instruction 1201 and saves the threshold value for peak light and then advances to instruction box 1203. At instruction 1203 the program saves the step size and its threshold as none. After saving the step size, the program advances to command instruction 1205 and sets the light threshold level to its minimum level at DAC+K5. After setting the light threshold to its minimum level at DAC+K5, the program advances to command instruction 1207 where it saves the area of light as none and then proceeds to command instruction 1209. At the instruction 1209, the sensor 14 is commanded to scan for an area of light. The program then advances to decision instruction 1211 to determine whether a new area of light has been found at about the same level as that saved. If no new area of light has been found, the program goes to box K in FIG. 13.

Referring to FIG. 13, at box K, the program proceeds to decision instruction 1301 to determine whether it was about the said area of light found for more than one threshold. If it was not, the program goes to box L and causes the execution of command instruction 1309 which increases the light threshold level by K6. After setting the light threshold level by K6, the program advances to decision instruction 1311 to determine whether the threshold level is at or above the saved peak threshold level. If the peak level is not, the program goes to box J in FIG. 12 and causes the command instruction 1209 to be executed again. The program then proceeds from instruction 1209 as previously described.

If the threshold level is at or above the saved peak threshold level, the program goes to box M in FIG. 14.

Referring again to decision instruction 1301 in FIG. 13, if the area of light was about the same, the program advances to decision box 1303 to determine whether the saved light area is within the maximum and minimum levels. If the light is not, the program goes to box L and proceeds as previously described. If the area is within the maximum and minimum levels, the program advances to decision instruction 1305 to determine whether the step of light saved is larger. If it is not, the program goes to box L and proceeds as previously described. If the step is large, the program proceeds to an instruction 1307. At box 1307 the program saves the new step size and the threshold at the midpoint of the step. After executing the instruction at 1307, the program goes to box 1309 and increases the light threshold by K6. The program then proceeds as previously described. From box M in FIG. 14, the program executes the decision instruction 1401 to determine whether a step of light was found. If the light was not a step of light, the program goes to decision instruction 1403 and tries to find a step of light for K7 a predetermined number of times. If no step of light is found for K7 after a predetermined number of times, the program returns to box G in FIG. 11 and proceeds from instruction 1107, as previously described.

Referring again to FIG. 14, if at decision instruction 1403 the step of light was found, the program proceeds from decision instruction 1403 to command instruction 1405 and toggles the exposure time between two and four frames. The program then goes to decision instruction 1407 and tries to find a step of light at both of the exposure rates. If a step of light is found at both of the exposure rates, the program then proceeds to command instruction box 1409 and causes the microprocessor 549 to generate a signal for making a sound to inform the user that there is too much light or that the camera needs to be moved. After sounding the alarm, the program returns to box A to wait for a new command from the user. If at decision instruction 1407 the program finds that it was not able to find a step of light at both exposures, the program goes to box B returning to instruction 907 in FIG. 9 and proceeds as previously described.

Considering again, decision instruction 1401 in FIG. 14, if a step of light was found, the program proceeds from decision instruction 1401 to box N in order to align the camera. At box N the program advances to command instruction 1501 and sets the light threshold at the midpoint of the found step of light. After setting the light threshold at the midpoint of the found step of light, the program goes to command instruction 1503 and scans for a new area of light. After initiating the scanning instruction for a new area of light, the program proceeds to decision instruction 1505 to determine whether the area of light is within the top margin. If the area of light is within the top margin, the program proceeds to command instruction 1507 to turn off the top light. After turning off the top light at instruction 1507, the program proceeds to decision instruction 1511 to determine whether the area of light is within the bottom margin. If the area of light is within the bottom margin, the program proceeds to instruction 1513 and turns off the bottom light. After turning off the bottom light, the program then goes to box P in FIG. 16.

At decision instruction 1505, if the area of light was not within the top margin, the program advances to command instruction 1509 and turns on the top light. After turning on the top light, the program advances to decision instruction 1511 to determine whether the area of light is within the bottom margin. If the area of light is not within the bottom margin, the program proceeds to command instruction 1515 and turns on the bottom light. After turning on the bottom light, the program goes to box P in FIG. 16.

From box P in FIG. 16, the program causes the decision instruction 1601 to be executed to determine whether the area of light is within the left margin. If the area of light is within the left margin, the program advances to command instruction 1603 and turns off the left light. After turning off the left light, the program goes to decision instruction 1607 to determine whether the area of light is within the right margin. If the area of light is within the right margin, the program advances to command instruction 1609 and turns off the right light. After turning off the right light, the program goes to decision instruction 1613 to determine whether all of the lights are off and whether they have been off for more than a K8 period of time. If they have not been off for more than a period of K8 time, or all of the lights are not off, the program returns to box 0 in FIG. 15 and once again executes command instruction 1503 proceeding as previously described. If all of the lights have been off for more then K8 period of time, the program goes to box Q in FIG. 17.

Considering, once again, decision instruction 1601 in FIG. 16, if the area of light is not within the left margin, the program advances to command instruction 1605 and turns on the left light. After turning on the left light, the program then advances to decision box 1607 to determine whether the area of light is within the right margin. If the area of light is not within the right margin, the program then proceeds to command instruction 1611 and turns on the right light. After turning on the right light, the program proceeds to box 1613 and proceeds as previously described.

As best seen in FIG. 17, at box Q, the program determines whether the background level and blooming levels are for normal conditions. In this regard, the program proceeding to instruction 1701 to issue a command to the data display to exit the clear mode and to display an active video image. After issuing the command to the computer 16, the program proceeds to command instruction 1703 to set the IRIS or exposure time to one frame. The program then proceeds to command instruction 1705 and sets the light threshold for a desired peak background light of K9. After setting the desired peak background light of K9, the program goes to command instruction 1707 and sets the background level to its maximum level. After setting the background level at maximum, the program then proceeds to the command instruction 1709 and sets the blooming level to its maximum level. After setting the blooming level to its maximum level, the program advances to command instruction 1711 and causes the image sensor device 14 to scan for light. The program then goes to decision instruction 1713 to determine whether light was found above the threshold level. If light was found above the threshold level, the program goes to box S in FIG. 18 and executes a decision instruction 1801 to determine whether the black level is at its minimum. If the black level is not at its minimum, the program goes to command instruction 1803 and lowers the black level by K2 level. After lowering the black background level by the K2 level, the program advances to box R in FIG. 17 to execute command instruction 1711 as previously described.

Figure 19:
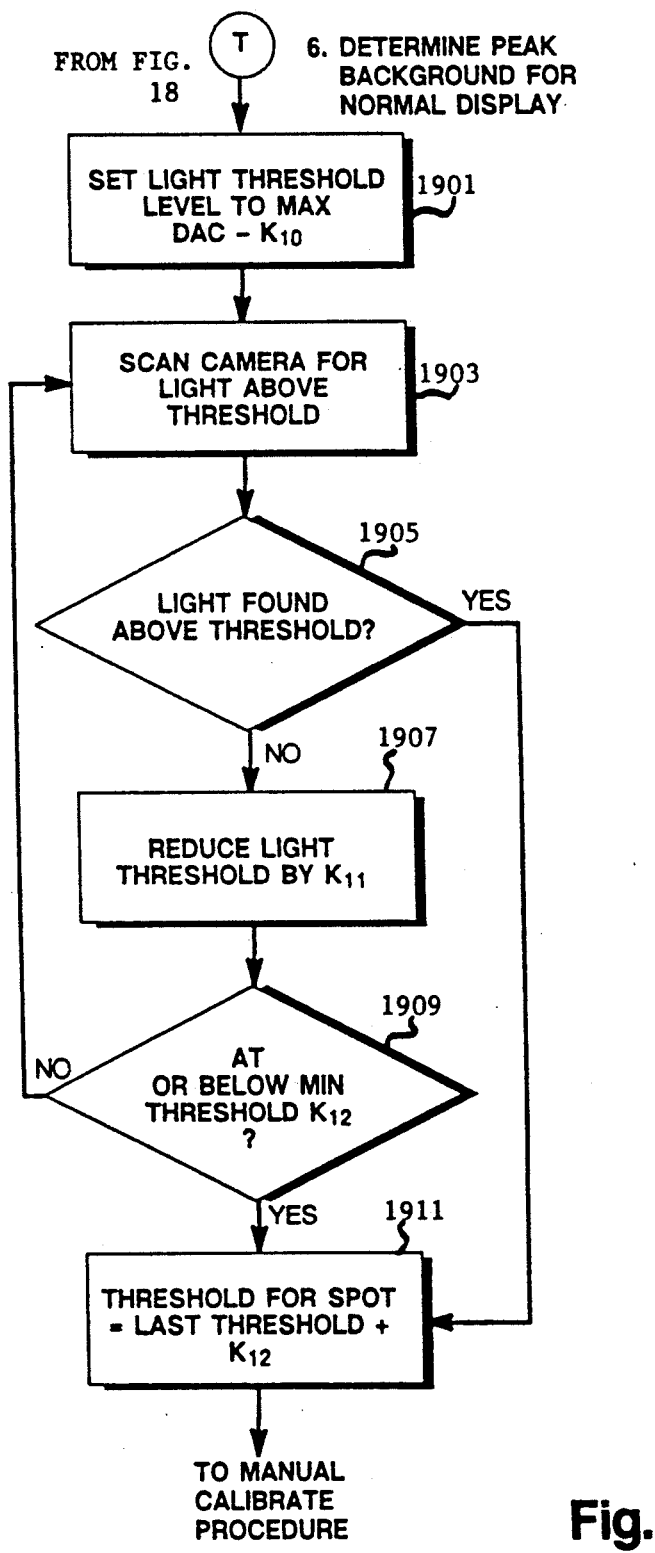

Referring again to FIG. 17, at decision instruction 1713 if light is not found above the threshold level, the program proceeds to box T of FIG. 19. At box T the program determines whether the peak background is for the normal display and causes the command instruction 1901 to be executed. Command instruction 1901 sets the light threshold level to its maximum at DAC-K10. After setting the light threshold to its level, the program proceeds to command instruction 1903 and once again scans for light above the set threshold level. The program then advances to decision instruction 1905 to determine whether light was found above the threshold level. If light was found above the threshold level, the program advances to command instruction 1911 and sets the threshold for a spot equal to the last threshold level plus K12. After setting the threshold for a spot equal to the last threshold plus K12, the program then proceeds to the manual calibration procedure as previously described in the parent application No. 073,029.

Referring again to FIG. 19, decision instruction 1905, if light is not found above the threshold level, the program proceeds to command instruction 1907. At command instruction 1907, the program causes the threshold level light to be reduced by K11. After reducing the threshold level by K11, the program proceeds to decision instruction 1909 to determine whether the light is at or below the minimum threshold level K12. If the light is not at or below the minimum threshold level K12, the program returns to command instruction 1903 and proceeds as previously described. If the light is at or below the minimum threshold level K12, the program then advances to instruction 1911 and proceeds as previously described.

Referring now to FIG. 18 at decision instruction 1805, if it is determined that the blooming level is not set at its minimum level, the program proceeds to command instruction 1807. At command instruction 1807, the blooming level is lowered by K3. The program then goes to box R in FIG. 17 causing instruction 1711 to be executed as previously described.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

While the preferred embodiment of the present invention is adapted for use with an overhead projector, it will be understood by those skilled in the art that any similar type of display device could be used, such as a slide projector, an integrated projector, a large screen television set or a computer monitor.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. Optical input system calibration apparatus for facilitating alignment with an image reflected from a viewing surface, comprising:
   a housing;
   a single light sensing device for detecting the image reflecting from the viewing surface;
   said light sensing device being adapted to be positioned in general alignment with a rectangularly shaped image reflecting from the viewing surface, said rectangularly shaped image being defined by four corner portions;
   universal mounting means mounted to said housing for supporting said light sensing device and for permitting it to be moved to an adjusted position relative to the viewing surface so that the entire image reflecting from the viewing surface is detected;
   means responsive to said light sensing device for generating electrical signals indicative which ones of the corner portions are detected from the image reflecting from the viewing surface;
   alignment means responsive to said electrical signals for determining direction movements required to detect currently undetected corner portions of the reflect image, in any;
   microprocessor means responsive to said alignment means for causing alignment signals to be generated, said alignment signals being indicative of movement directions for repositioning said light sensing device to a corrected position so it receives substantially the entire image reflecting from the viewing surface.

2. A calibration apparatus according to claim 1, further comprising:
   signal means responsive to said light sensing device for generating a detection signal indicative of the presence of light detected by said light sensor means;
   offset means for preventing said signal means from generating a detection signal in response to the presence of detected background light, when said background light does not exceeds a predetermined luminance level; and
   reference level means coupled to said signal means for generating an auxiliary light information signal in response to the detection of an auxiliary light image and for generating a video signal in response to the detection of video image light reflected from the viewing surface.

3. A calibration apparatus according to claim 1, wherein said light sensing device is a charge coupled device.

4. A calibration apparatus according to claim 1, wherein said light sensing device includes an optical filter.

5. A calibration apparatus according to claim 4, wherein said optical filter is a ruby lith filter.

6. A calibration apparatus according to claim 4, wherein said optical filter is a red acetate filter.

7. A calibration apparatus according to claim 1, wherein said light sensing device is a charge couple device for sensing the presence of light over a given period of time.

8. A calibration apparatus according to claim 7, wherein said light sensing device is a raster scan device.

9. A calibration apparatus according to claim 7, wherein said given period of time is adjustable between a range of about 0.666 seconds and 0.166 seconds.

10. A calibration apparatus according to claim 8, wherein said raster scan device includes exposure means for adjusting said given period of time between a minimum period of time and a maximum period of time.

11. A calibration apparatus according to claim 10, wherein said minimum period of time corresponds to one refresh cycle of said reflected image.

12. A calibration apparatus according to claim 11, wherein said maximum period of time corresponds to four refresh cycles of said reflected image.

13. A calibration apparatus according to claim 1, wherein said alignment means includes indicating means for helping a user to properly align the viewing area of said light sensing device to be able to detect the light from the image reflecting from said viewing surface and the viewing surface adjacent to and surrounding the image reflecting from said viewing surface.

14. A calibration apparatus according to claim 13, wherein said indicating means includes a set of four light emitting devices.

15. A calibration apparatus according to claim 14, wherein said light emitting devices are light emitting diodes.

16. A calibration apparatus according to claim 15, wherein said light emitting devices are arranged in a diamond-shaped configuration.

17. A calibration apparatus according to claim 13, wherein said user interactive positioning means includes indicia means indicative of positioning directions.

18. A calibration apparatus according to claim 14, wherein said position directions includes UP, DOWN, RIGHT, LEFT.

19. A calibration apparatus according to claim 1, further comprising:
digital to analog converter means for generating an analog bias voltage to control the light energy sensitivity of said light sensing device.

20. A calibration apparatus according to claim 17, wherein said algorithm means further includes means for causing said microprocessor to generate a set of four direction signals for helping a user to interactively align the viewing area of said raster scan field in proper orientation relative to a video image reflecting from said viewing surface.

21. Optical input system calibration apparatus for facilitating alignment with an image reflected from a viewing surface, comprising:
a single light sensing device for detecting the presence of light produced from an image reflecting from the viewing surface;
means for mounting said single light sensing device for universal movement relative to said viewing surface;
detecting means for determining whether the entire reflected image from the viewing surface can be detected and for generating a plurality of electrical signals indicative of the direction of any miscalibration; and
indicating means responsive to said signals for providing indications of miscalibration directions when the entire reflected image on the viewing surface can not be detected to indicate the direction of movement of said sensing device so that it can be adjusted positionally until it detects substantially the entire reflected image.

22. A calibration apparatus according to claim 21, wherein said indicating means includes light emitting means for providing a visual indication of said miscalibration directions.

23. A calibration apparatus according to claim 22, wherein said light emitting means includes a set of light emitting diodes.

24. Optical input system calibration apparatus for facilitating alignment with an image reflecting from a viewing surface according to claim 21, wherein said light sensing device includes:
means responsive to light reflecting from the viewing surface for generating an image signal indicative of the luminance levels of the light reflecting from the viewing surface;
timing generator means for producing raster scan signals to control the refresh rate of said means responsive to light reflecting from the viewing surface, said raster scan signals recurring during a predetermined time period;
light sensitivity means responsive to said image signal for generating a detection signal indicative of the presence of light reflecting from the viewing surface;
microprocessor means for adjusting the responsiveness of said light sensitivity means to said image signal so that said detection signal is indicative of light having a given luminance level; and refresh control means for causing said predetermined time period to be increased or decreased to adjust the sensitivity level of said means responsive to light reflecting from the viewing surface to different levels of luminance reflecting from the viewing surface.

25. A calibration apparatus according to claim 24, wherein said light sensitivity means is a comparator means having a pair of inputs, one of said inputs being coupled to said means responsive to light from the viewing surface and the other one of said inputs being coupled to said microprocessor means.

26. A calibration apparatus according to claim 25, further comprising: p1 image signal amplification means for increasing or decreasing the strength of said image signal to a sufficient level to enable said comparator means to generate a detection signal in response to said image signal.

27. A calibration apparatus according to claim 25, wherein said
microprocessor means includes
algorithm means for causing said microprocessor means to generate a digital signal indicative of a reference level voltage to control the responsiveness of said light sensitivity means to said image signal.

28. A calibration apparatus according to claim 7, further comprising:
band pass filter means for preventing said means responsive to light from detecting light information outside of a given wavelength range.

29. A method for aligning an optical computer input system comprising:
using a light sensing device for detecting the presence of light reflecting from a viewing surface;
generating electrical signals indicative of the height and width of the image reflecting from the viewing surface;
determining whether said light sensing device is sufficiently aligned relative to the reflected image to receive substantially the entire image reflecting from the viewing surface; and
causing alignment signals to be generated, said alignment signals being indicative of movement directions for repositioning said light sensing device to a corrected position so it receives substantially the entire image reflecting from the viewing surface.

30. A method for alignment according to claim 29, further comprising:
generating a light information signal in response to said light sensing device detecting light reflecting from the viewing surface;
responding to said light information signal by generating a detection signal indicative of the presence of light detected by said light sensing device; and
preventing said detection signal from being generated in response to the presence of detected background light, when said background light is less than a predetermined luminance level; and
generating an information signal in response to the detection of information light reflecting from the viewing surface.

31. Optical input system calibration apparatus for facilitating alignment with an image reflected from a viewing surface, comprising:
light sensing means for detecting the reflected image;
means for determining the width and height of a detected image on the viewing surface;

means for storing image detection signals indicative of the width and the height of said detected image;

means for comparing the stored signals with another set of signals indicative of the width and height of a projected image on the viewing surface;

computing means for determining the peripheral boundaries of said detected image; and means responsive to said means for comparing and to said computing means for generating left, right, up and down signals indicative of light sensing means movement directions, so that the entire peripheral boundaries of the reflected image can be detected by suitable movement to a corrected position of said light sensing means.

32. A method for aligning image detection means to receive a given image reflected from a viewing surface, comprising:

determining the width and height of a detected image on the viewing surface;

storing image detection signals indicative of X and Y distance values for the width and the height of said detected image;

comparing the stored signals with another set of signals indicative of the width and the height of a projected image on the viewing surface;

determining the peripheral boundaries of said detected image;

generating left, right, up and down signals indicative of movement directions, so that the entire peripheral boundaries of the reflected image can be detected by suitable movement to a corrected position of a light sensing device, whereby the entire width and height of the given image can be detected.

* * * * *

UNITED STATES PATENT AND TRADEMARK OFFICE
CERTIFICATE OF CORRECTION

PATENT NO. : 5,181,015

DATED : January 19, 1993

INVENTOR(S) : Roger N. Marshall, et al.

It is certified that error appears in the above-identified patent and that said Letters Patent is hereby corrected as shown below:

Column 18, line 14, after "comprising:" delete "p1", and substitute therefor a new paragraph break.

Column 18, line 27, after "claim" delete "7", and substitute therefor --26--.

Signed and Sealed this

Eighteenth Day of January, 1994

Attest:

BRUCE LEHMAN

*Attesting Officer*  *Commissioner of Patents and Trademarks*